United States Patent
Sikorski et al.

(10) Patent No.: US 11,383,845 B2
(45) Date of Patent: Jul. 12, 2022

(54) SEPARABLE MULTIPLE-PIECE FRAME ASSEMBLY

(71) Applicant: Safran Seats USA LLC, Gainesville, TX (US)

(72) Inventors: Jeffrey L. Sikorski, Melissa, TX (US); Kevin M. Waters, Denton, TX (US); Christopher D. Stewart, Saint Jo, TX (US); Delphine F. Augot, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 149 days.

(21) Appl. No.: 16/970,940

(22) PCT Filed: Jun. 15, 2018

(86) PCT No.: PCT/US2018/037726
§ 371 (c)(1),
(2) Date: Aug. 18, 2020

(87) PCT Pub. No.: WO2019/164540
PCT Pub. Date: Aug. 29, 2019

(65) Prior Publication Data
US 2020/0391869 A1 Dec. 17, 2020

Related U.S. Application Data

(60) Provisional application No. 62/633,986, filed on Feb. 22, 2018.

(51) Int. Cl.
*B64D 11/06* (2006.01)
*B60R 11/00* (2006.01)

(52) U.S. Cl.
CPC ...... *B64D 11/0648* (2014.12); *B64D 11/0693* (2013.01); *B60R 2011/0014* (2013.01)

(58) Field of Classification Search
CPC . B64D 11/06; B64D 11/0644; B64D 11/0648; B64D 11/0693;
(Continued)

(56) References Cited

U.S. PATENT DOCUMENTS 5,409,186 A * 4/1995 Chow ................ B64D 11/0696
165/41
5,727,845 A * 3/1998 Jackson-Wynch ..........................
B64D 11/0693
244/118.6

(Continued)

FOREIGN PATENT DOCUMENTS

EP         0443664          8/1991
WO     2014058399         4/2004

OTHER PUBLICATIONS

International Patent Application No. PCT/US2018/037726, International Search Report and Written Opinion, dated Nov. 6, 2018.

*Primary Examiner* — Justin M Benedik
(74) *Attorney, Agent, or Firm* — Kilpatrick Townsend & Stockton LLP

(57) ABSTRACT

A separable multiple-piece frame assembly (100) for a passenger seat of a vehicle includes a first spreader portion (101) with an inner face, a second spreader portion (201) with an inner face, a plurality of attachments (11, 12, 13, 14, 15, 16) for releasably attaching the first spreader portion (101) and the second spreader portion (201), and an attached configuration. In the attached configuration, the inner face of the first spreader portion and the inner face of the second spreader portion are in contact with one another.

18 Claims, 5 Drawing Sheets

(58) Field of Classification Search
CPC ... B60R 2011/0014; A47C 1/12; A47C 1/124; B29C 70/54; B60N 2/68; B60N 2/01; B60N 2/682
See application file for complete search history.

(56) References Cited

U.S. PATENT DOCUMENTS

| | | | |
|---|---|---|---|
| 10,953,777 B1* | 3/2021 | Rathore | A47C 7/543 |
| 10,988,260 B2* | 4/2021 | Gross | B64D 11/0693 |
| 2003/0094838 A1* | 5/2003 | Williamson | B64D 11/0648 |
| | | | 297/232 |
| 2004/0099766 A1* | 5/2004 | Pratt, Jr. | B64D 11/0649 |
| | | | 244/118.6 |
| 2011/0101162 A1* | 5/2011 | Zimmermann | B64D 11/0693 |
| | | | 244/118.6 |
| 2011/0303790 A1 | 12/2011 | Isele et al. | |
| 2014/0232153 A1* | 8/2014 | Bell | B64D 11/0696 |
| | | | 297/452.1 |
| 2018/0105272 A1* | 4/2018 | Scott | B64D 11/0646 |
| 2019/0047710 A1* | 2/2019 | Bell | B64D 11/064 |

\* cited by examiner

SEPARABLE MULTIPLE-PIECE FRAME ASSEMBLY

CROSS REFERENCE TO RELATED APPLICATION

This application is related to and claims the benefit of U.S. Provisional Application No. 62/633,986 ("the '986 application"), filed on Feb. 22, 2018, entitled METHOD FOR CONSTRUCTING A MULTIPLE PIECE AIRCRAFT SEAT FRAME. The '986 application is hereby incorporated in its entirety by this reference.

FIELD OF THE INVENTION

The field of the invention relates to separable multiple-piece frame assemblies for passenger seats in aircraft or the like.

BACKGROUND

Passenger seats, and particularly vehicle or aircraft passenger seats, are designed based on numerous factors including, for example, ensuring passenger safety for various loading conditions, minimizing weight, simplifying manufacturing, reducing cost, facilitating installation, simplifying shipping, among other factors. Conventional seats are typically designed for two to four occupants and use a framework arrangement with a frame assembly between adjacent seating positions along the lateral length of the seat and a plurality of support members that extend laterally and connect to each of the plurality of frame assemblies. Based on the cabin width of some vehicles (e.g., aircraft), in some cases, to optimize available space, it may be desirable to utilize a seat with five or more seating positions in the lateral direction of the seat. However, typical seats are designed with a maximum of four seating positions in the lateral direction because increasing the lateral dimension (beyond that of a four seating position seat) yields a seat that is impractical to ship, too large to manipulate into the vehicle, and is otherwise unworkable for varied reasons.

In certain situations, it may be desirable to design seats and related framework for five or more seating positions in the lateral direction where the seat can be separated into multiple pieces and reassembled after being shipped and moved into the cabin of the vehicle. In particular, it may be desirable to design and produce a framework for a seat with a multiple-piece frame assembly that can be disassembled such that the seat can be separated into multiple pieces that are structurally independent and capable of being shipped and manipulated independently.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a separable multiple-piece frame assembly for a passenger seat of a vehicle comprises: a first spreader portion with an inner face; a second spreader portion with an inner face; a plurality of attachments for releasably attaching the first spreader portion and the second spreader portion; and an attached configuration, wherein the inner face of the first spreader portion and the inner face of the second spreader portion are in contact with one another.

In some embodiments, the plurality of attachments comprise at least one of fasteners and clamps.

In certain embodiments, a first portion of a forward lateral member extends from the first spreader portion in a direction opposite from the inner face of the first spreader portion; and a second portion of the forward lateral member extends from the second spreader portion in a direction opposite from the inner face of the second spreader portion.

In some embodiments, a first portion of an aft lateral member extends from the first spreader portion in a direction opposite from the inner face of the first spreader portion; and a second portion of the aft lateral member extends from the second spreader portion in a direction opposite from the inner face of the second spreader portion.

The separable multiple-piece frame assembly, in certain embodiments, comprises a forward coupler, wherein, in the attached configuration, the forward coupler extends between (i) an interface of the first portion of the forward lateral member and the first spreader portion and (ii) an interface of the second portion of the forward lateral member and the second spreader portion; and an aft coupler, wherein, in the attached configuration, the aft coupler extends between (i) an interface of the first portion of the aft lateral member and the first spreader portion and (ii) an interface of the second portion of the aft lateral member and the second spreader portion.

The forward coupler, in certain embodiments, comprises: a hollow cylindrical member that is disposed within the forward lateral member; and a fastener for securing the forward coupler relative to the first spreader portion passes through a full diameter of the forward coupler and a full diameter of the forward lateral member.

In some embodiments, the first spreader portion comprises a seat pan portion and a seat back portion; and the second spreader portion comprises a seat pan portion and a seat back portion.

The plurality of attachments, in some embodiments, comprise: at least two seat pan fasteners attaching the seat pan portion of the first spreader portion to the seat pan portion of the second spreader portion; and at least two seat back fasteners attaching the seat back portion of the first spreader portion to the seat back portion of the second spreader portion.

In certain embodiments, the at least two seat pan fasteners comprise at least one of (i) a fastener located under an interface with a forward lateral member and (ii) a fastener located under an interface with an aft lateral member.

In some embodiments, an armrest assembly comprises a fitting that is sandwiched between the first spreader portion and the second spreader portion in the attached configuration.

According to certain embodiments of the present invention, a passenger seat comprises: a separable multiple-piece frame assembly comprising (i) a first spreader portion with an inner face and (ii) a second spreader portion with an inner face; a forward lateral member comprising: a first portion attached to the first spreader portion and extending away from the first spreader portion in a direction that is approximately perpendicular to the inner face of the first spreader portion; and a second portion attached to the second spreader portion and extending away from the second spreader portion in a direction that is approximately perpendicular to the inner face of the second spreader portion; an aft lateral member comprising: a first portion attached to the first spreader portion and extending away from the first spreader portion in a direction that is approximately perpendicular to the inner face of the first spreader portion; and a second portion attached to the second spreader portion and extending away from the second spreader portion in a direction that is approximately perpendicular to the inner face of the second spreader portion, wherein: the separable multiple-piece frame assembly comprises provisions for removably attaching the first spreader portion and the second spreader portion; and the separable multiple-piece frame assembly comprises an attached configuration, wherein the inner face of the first spreader portion and the inner face of the second spreader portion are in contact with one another.

The separable multiple-piece frame assembly of the passenger seat, in certain embodiments, comprises a plurality of attachments for releasably attaching the first spreader portion and the second spreader portion.

The passenger seat, in some embodiments, comprises a forward coupler, wherein, in the attached configuration, the forward coupler extends between (i) an interface of the first portion of the forward lateral member and the first spreader portion and (ii) an interface of the second portion of the forward lateral member and the second spreader portion; and an aft coupler, wherein, in the attached configuration, the aft coupler extends between (i) an interface of the first portion of the aft lateral member and the first spreader portion and (ii) an interface of the second portion of the aft lateral member and the second spreader portion.

In certain embodiments, the forward coupler comprises: a hollow cylindrical member that is disposed within the forward lateral member; and a fastener for securing the forward coupler relative to the first spreader portion passes through a full diameter of the forward coupler and a full diameter of the forward lateral member.

In some embodiments, the first spreader portion comprises a seat pan portion and a seat back portion; and the second spreader portion comprises a seat pan portion and a seat back portion.

The plurality of attachments, in certain embodiments, comprise: at least two seat pan fasteners attaching the seat pan portion of the first spreader portion to the seat pan portion of the second spreader portion; and at least two seat back fasteners attaching the seat back portion of the first spreader portion to the seat back portion of the second spreader portion.

In certain embodiments, the at least two seat pan fasteners comprise at least one of (i) a fastener located under an interface with the forward lateral member and (ii) a fastener located under an interface with the aft lateral member.

In some embodiments, an armrest assembly comprises a fitting that is sandwiched between the first spreader portion and the second spreader portion in the attached configuration.

According to certain embodiments of the present invention, a method of assembling a passenger seat comprises: providing a separable multiple-piece frame assembly comprising a first spreader portion with an inner face and a second spreader portion with an inner face; attaching a first portion of a forward lateral member to the first spreader portion; attaching a second portion of the forward lateral member to the second spreader portion; attaching a first portion of an aft lateral member to the first spreader portion; attaching a second portion of the aft lateral member to the second spreader portion; and attaching the first spreader portion and the second spreader portion such that the inner face of the first spreader portion and the inner face of the second spreader portion are in contact with one another.

In some embodiments, the method comprises: attaching a forward coupler to at least one of the first spreader portion and the second spreader portion such that, in an attached configuration, the forward coupler extends between (i) an interface of the first portion of the forward lateral member and the first spreader portion and (ii) an interface of the second portion of the forward lateral member and the second spreader portion; and attaching an aft coupler to at least one of the first spreader portion and the second spreader portion such that, in the attached configuration, the aft coupler extends between (i) an interface of the first portion of the aft lateral member and the first spreader portion and (ii) an interface of the second portion of the aft lateral member and the second spreader portion.

DETAILED DESCRIPTION

Figure 1:
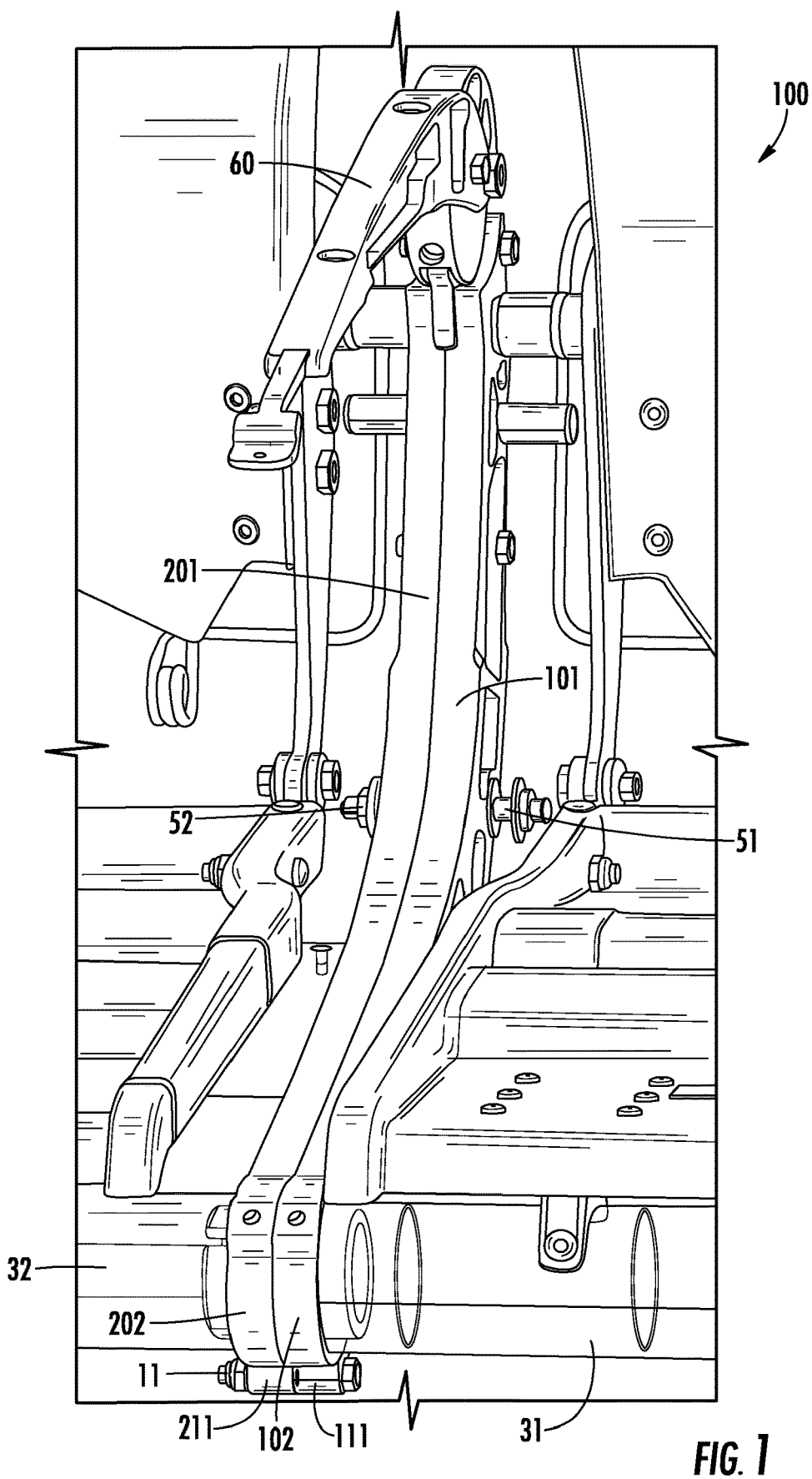
FIG. 1 is a front perspective view of a passenger seat according to certain embodiments of the present invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

FIGS. 1-5 illustrate embodiments of separable multiple-piece frame assemblies 100 for passenger seats in vehicles such as an aircraft at a location where the seat would typically include a continuous portion that is not separable. The separable multiple-piece frame assembly 100 may include a first spreader portion 101 and a second spreader portion 201. Conventional seats include continuous lateral members that extend the full lateral length of the seat. However, as shown in the drawings, a seat that incorporates the separable multiple-piece frame assembly 100 may include a forward lateral member separated into a first portion 31 and a second portion 32. The separable multiple-piece frame assembly 100 may also include an aft lateral member separated into a first portion 41 and a second portion 42. The lateral members 31, 32, 41, 42 attach to spreader members (including, for example, the separable multiple-piece frame assembly 100) and leg assemblies (not shown) that attach to a floor and/or substructure of the vehicle. In some embodiments, forces due to passenger(s) in the seat result in loads that are transferred through the seat to at least one of the spreader members, before being transferred to at least one of lateral members, before eventually being transferred into at least one of the leg assemblies (and subsequently into the floor and/or substructure of the vehicle). Each of the spreader members includes (i) a seat pan portion that extends between a forward portion and an aft portion and (ii) a seat back portion that extends between the aft portion and an upper portion. For example, the first spreader portion 101 includes (i) a seat pan portion that extends between a forward portion 102 and an aft portion 103 and (ii) a seat back portion that extends between the aft portion 103 and an upper portion 104. The second spreader portion 201 includes (i) a seat pan portion that extends between a forward portion 202 and an aft portion 203 and (ii) a seat back portion that extends between the aft portion 203 and an upper portion 204. The separable multiple-piece frame assembly 100 is shown in an attached configuration in FIG. 1 and in an detached configuration in FIGS. 2-5. In the attached configuration, the first spreader portion 101 and the second spreader portion 201 are in face-to-face contact and are securely attached to one another. In particular, in the attached configuration, the inner face 101.1 of the first spreader portion 101 and the inner face 201.1 of the second spreader portion 201 are in contact with one another.

The interface with the forward lateral member may include a cylindrical opening (in one or both of the first spreader portion 101 and the second spreader portion 201) with dimensions corresponding to the outer diameter of the forward lateral member. The interface with the aft lateral member may include a cylindrical opening (in one or both of the first spreader portion 101 and the second spreader portion 201) with dimensions corresponding to the outer diameter of the aft lateral member.

In some embodiments, at least one separable multiple-piece frame assembly 100 is located within a seat designed for five or more seating positions in the lateral direction. In some cases, the at least one separable multiple-piece frame assembly 100 separates the seat into multiple sections that each have four or fewer seating positions. For example, a separable multiple-piece frame assembly 100 can be used to separate an eight seating position seat into two sections that each have four seating positions. A separable multiple-piece frame assembly 100 can be used to separate a five seating position seat into two sections that have two and three seating positions.

The separable multiple-piece frame assembly 100 may include a seat belt anchor that includes a first portion 51 attached to the aft portion 103 of the first spreader portion 101 and a second portion 52 attached to the aft portion 203 of the second spreader portion 201. The separable multiple-piece frame assembly 100 may also include an armrest assembly 60 that is attached to at least one of (i) the upper portion 104 of the first spreader portion 101 and (ii) the upper portion 204 of the second spreader portion 201.

As described above, conventional seats are not separable at the location of the spreader member. In other words, conventional seats include a single spreader member, but the separable multiple-piece frame assembly 100 replaces a single spreader with the first spreader portion 101 and the second spreader portion 201 with a corresponding break in the lateral members (31/32 and 41/42), as described above. Even if a conventional seat were designed with separable lateral members, to separate the seat, the single spreader member would be required to remain attached to one of the two sides leaving the second side unstable with nothing to support the cantilevered portions of the lateral members.

To attach the first spreader portion 101 and the second spreader portion 201, the separable multiple-piece frame assembly 100 may include provisions for a plurality of attachments where the attachments may include at least one of fasteners, clamps, or any other appropriate mechanism for releasably attaching the first spreader portion 101 and the second spreader portion 201. The attachment(s) between the first spreader portion 101 and the second spreader portion 201 are configured such that the first spreader portion 101 and the second spreader portion 201 can be easily detached from one another for shipping, transport to a location for installation, or any other appropriate. In addition, the attachment(s) between the first spreader portion 101 and the second spreader portion 201 are configured such that the first spreader portion 101 and the second spreader portion 201 can be securely attached to one another to withstand appropriate loading conditions such that (once assembled at the separable multiple-piece frame assembly 100) the seat functions in the same manner as a conventional seat with a single spreader and continuous lateral members.

As shown in the drawings, in some embodiments, the separable multiple-piece frame assembly 100 may include six fasteners for attaching the first spreader portion 101 and the second spreader portion 201. However, the separable multiple-piece frame assembly 100 may include any number of fasteners for attaching the first spreader portion 101 and the second spreader portion 201 (including fewer than or more than six fasteners). For example, the separable multiple-piece frame assembly 100 may be configured to include two fasteners in the seat pan portion and two fasteners in the seat back portion (four total fasteners). A first fastener 11 attaches the front fastener portion 111 of the first spreader portion 101 and the front fastener portion 211 of the second spreader portion 201 (see FIGS. 1, 2, and 5). A second fastener 12 attaches the seat pan fastener portion 112 of the first spreader portion 101 and the seat pan fastener portion 212 of the second spreader portion 201 (see FIG. 5). A third fastener 13 attaches the aft fastener portion 113 of the first spreader portion 101 and the aft fastener portion 213 of the second spreader portion 201 (see FIGS. 3 and 5). A fourth fastener 14 attaches the lower fastener portion 114 of the first spreader portion 101 and the lower fastener portion 214 of the second spreader portion 201 (see FIGS. 3 and 4). A fifth fastener 15 attaches the seat back fastener portion 115 of the first spreader portion 101 and the seat back fastener portion 215 of the second spreader portion 201 (see FIGS. 3 and 4). A sixth fastener 16 attaches the upper fastener portion 116 of the first spreader portion 101 and the upper fastener portion 216 of the second spreader portion 201 (see FIGS. 3 and 4).

The fasteners 11-16 are illustrated such that the axial direction of each fastener is parallel to a lateral direction of the seat (e.g., normal to a butt line plane of the vehicle, assuming the seat faces a fore/aft direction). However, the fasteners may be arranged in other orientations based on the appropriate attachments for the first spreader portion 101 and the second spreader portion 201.

Figure 2:
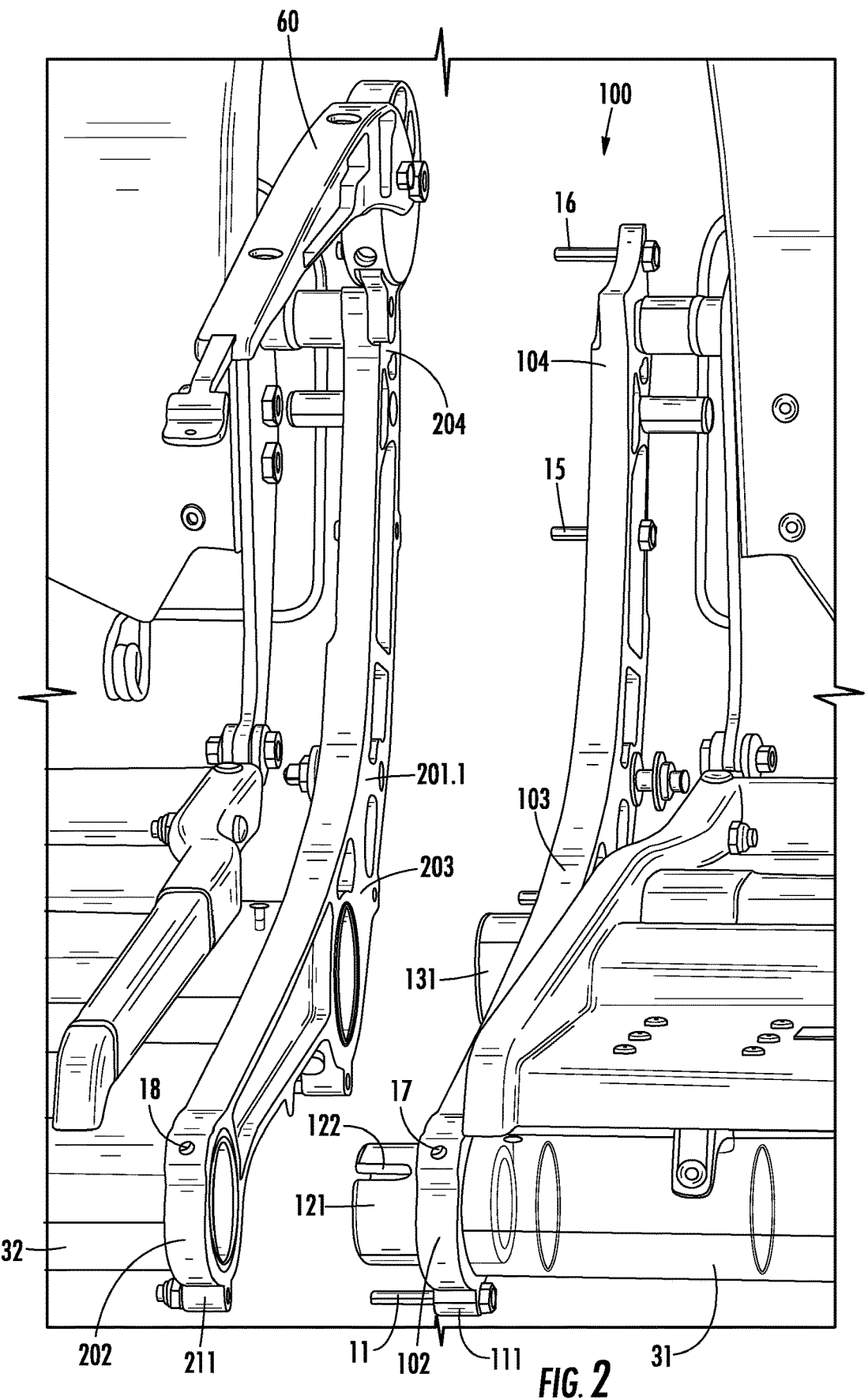
FIG. 2 is a front perspective exploded view of the passenger seat of FIG. 1.
Figure 5:
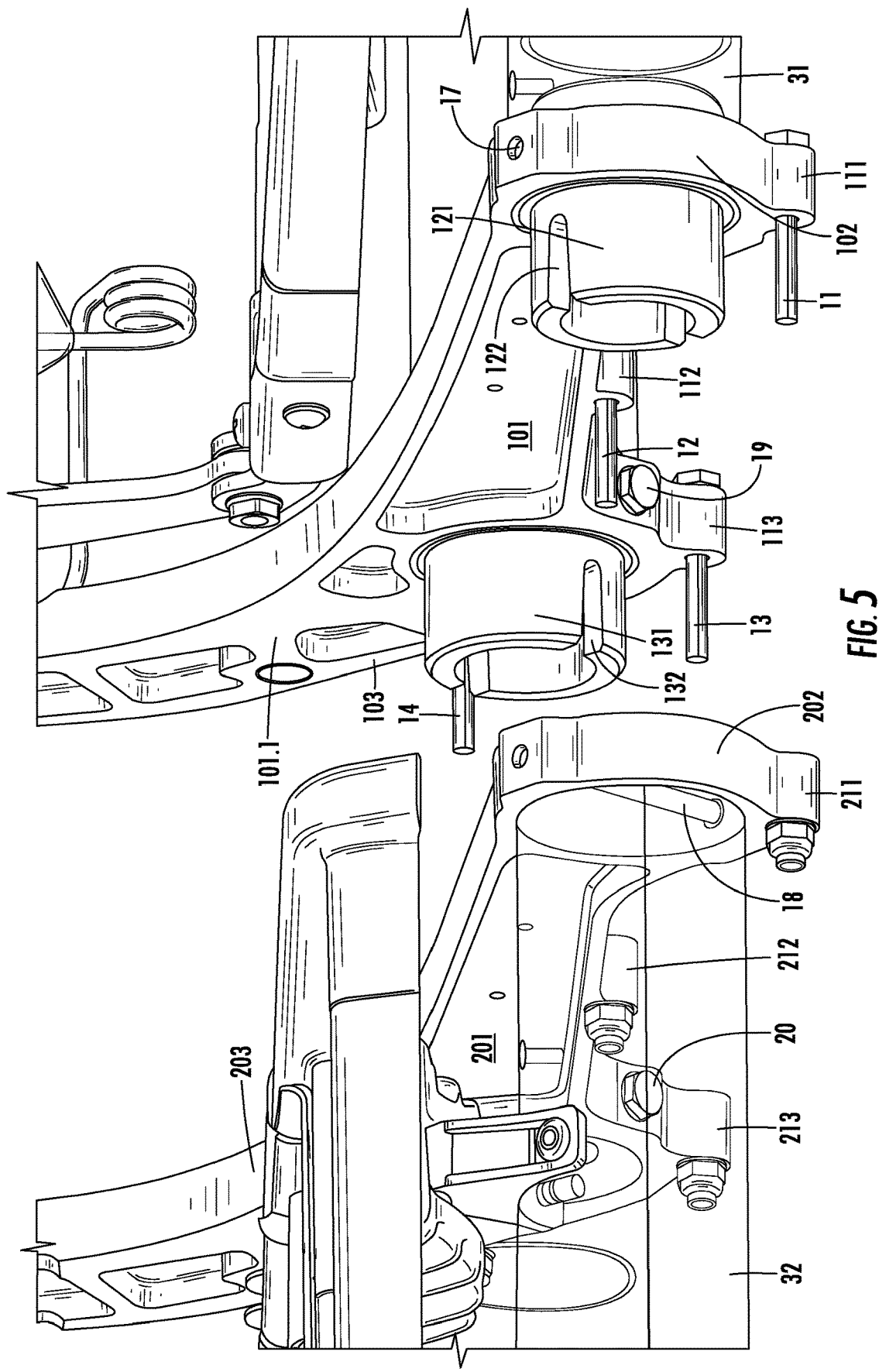
FIG. 5 is a front perspective exploded view the passenger seat of FIG. 1.

The front fastener portion 111 may be located in the forward portion 102 of the first spreader portion 101 (see FIGS. 1, 2, and 5). In some embodiments, the front fastener portion 111 is located directly underneath the interface between (i) the first spreader portion 101 and (ii) the first portion 31 of the forward lateral member. Similarly, the front fastener portion 211 may be located in the forward portion 202 of the second spreader portion 201. In some embodiments, the front fastener portion 211 is located directly underneath the interface between (i) the second spreader portion 201 and (ii) the second portion 32 of the forward lateral member.

As shown in FIG. 5, the seat pan fastener portion 112 may be located in the seat pan portion of the first spreader portion 101. In some embodiments, the seat pan fastener portion 112 is located approximately halfway between (i) the first portion 31 of the forward lateral member and (ii) the first portion 41 of the aft lateral member. Similarly, the seat pan fastener portion 212 may be located in the seat pan portion of the second spreader portion 201. In some embodiments, the seat pan fastener portion 212 is located approximately halfway between (i) the second portion 32 of the forward lateral member and (ii) the second portion 42 of the aft lateral member.

Figure 3:
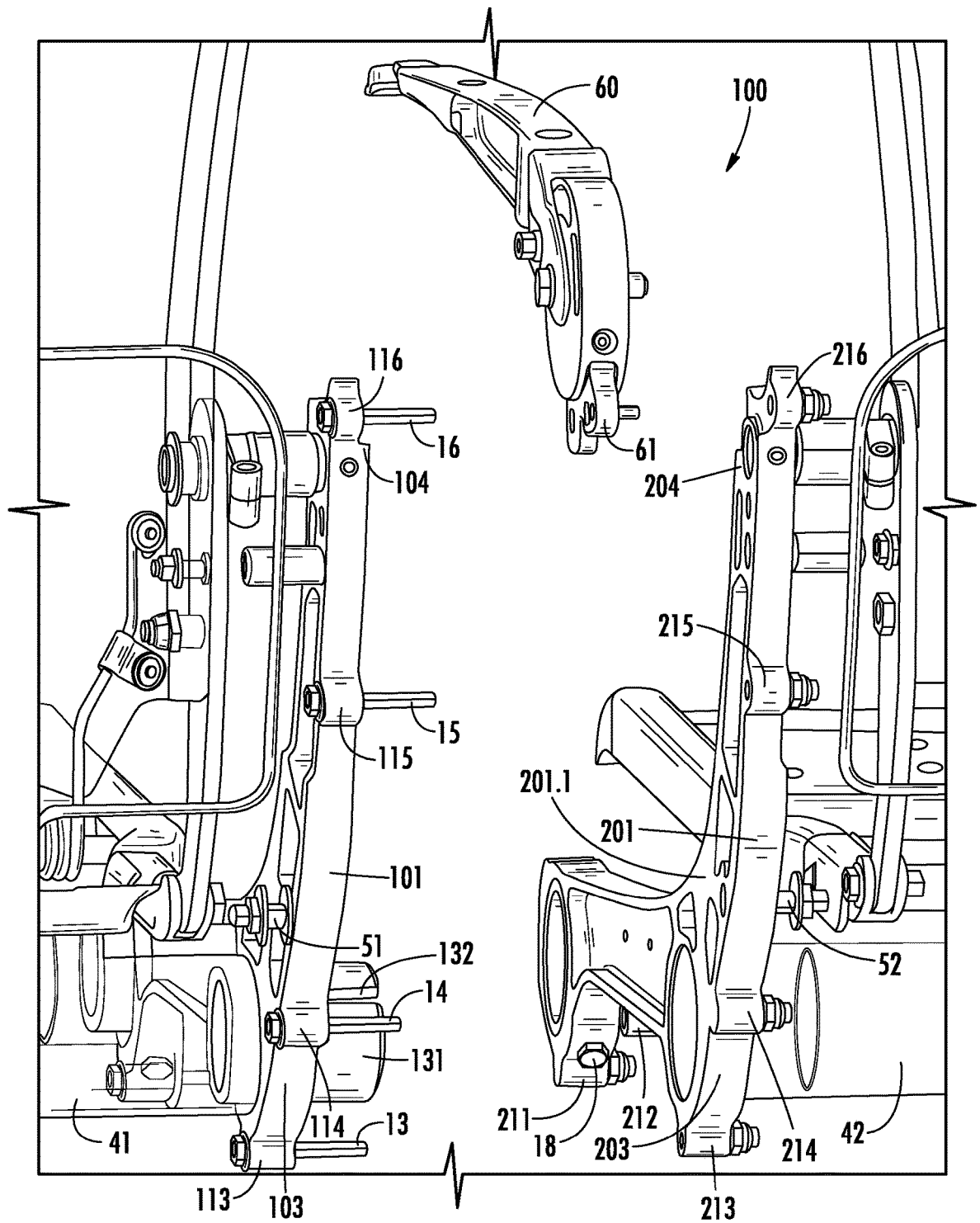
FIG. 3 is a rear perspective exploded view the passenger seat of FIG. 1.

The aft fastener portion 113 may be located in the aft portion 103 of the first spreader portion 101 (see FIGS. 3 and 5). In some embodiments, the aft fastener portion 113 is located directly underneath the interface between (i) the first spreader portion 101 and (ii) the first portion 41 of the aft lateral member. Similarly, the aft fastener portion 213 may be located in the aft portion 203 of the second spreader portion 201. In some embodiments, the aft fastener portion 213 is located directly underneath the interface between (i) the second spreader portion 201 and (ii) the second portion 42 of the aft lateral member.

Figure 4:
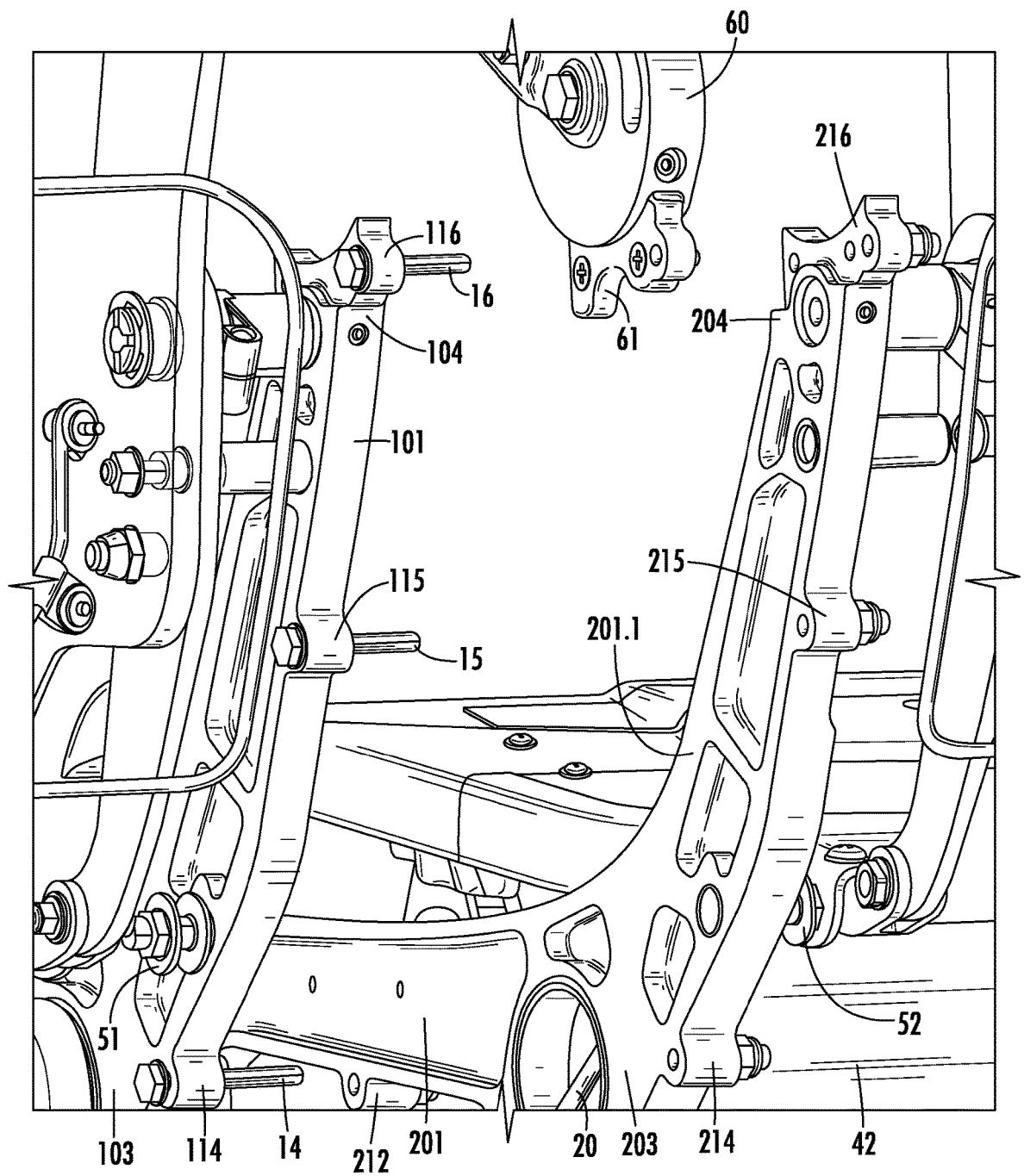
FIG. 4 is a rear perspective exploded view the passenger seat of FIG. 1.

As shown in FIGS. 3 and 4, the lower fastener portion 114 may be located on an aft side of the aft portion 103 of the first spreader portion 101. In some embodiments, the lower fastener portion 114 is located directly aft of the interface between (i) the first spreader portion 101 and (ii) the first portion 41 of the aft lateral member. Similarly, the lower fastener portion 214 may be located on an aft side of the aft portion 203 of the second spreader portion 201. In some embodiments, the lower fastener portion 214 is located directly aft of the interface between (i) the second spreader portion 201 and (ii) the second portion 42 of the aft lateral member.

The seat back fastener portion 115 may be located in the seat back portion of the first spreader portion 101 (see FIGS. 3 and 4). In some embodiments, the seat back fastener portion 115 is located approximately halfway between (i) the aft portion 103 of the first spreader portion 101 and (ii) the upper portion 104 of the first spreader portion 101. Similarly, the seat back fastener portion 215 may be located in the seat back portion of the second spreader portion 201. In some embodiments, the seat back fastener portion 215 is located approximately halfway between (i) the aft portion 203 of the second spreader portion 201 and (ii) the upper portion 204 of the second spreader portion 201.

As shown in FIGS. 3 and 4, the upper fastener portion 116 may be located in the upper portion 104 of the first spreader portion 101. In some embodiments, the upper fastener portion 116 is located directly aft of the interface between (i) the first spreader portion 101 and (ii) the armrest assembly 60. Similarly, the upper fastener portion 216 may be located in the upper portion 204 of the second spreader portion 201. In some embodiments, the upper fastener portion 216 is located directly aft of the interface between (i) the second spreader portion 201 and (ii) the armrest assembly 60.

To facilitate attachment and alignment between the first spreader portion 101, the second spreader portion 201, the first portion 31 of the forward lateral member, and the second portion 32 of the forward lateral member, the separable multiple-piece frame assembly 100 may include a forward coupler 121. The separable multiple-piece frame assembly 100 may also include a aft coupler 131 for attaching and aligning the first spreader portion 101, the second spreader portion 201, the first portion 41 of the aft lateral member, and the second portion 42 of the aft lateral member. Although the forward coupler 121 is shown attached to the first spreader portion 101, the forward coupler 121 may be attached to the second spreader portion 201. In some embodiments, as shown in FIGS. 2 and 5, the forward coupler 121 is a hollow cylindrical member attached to the first spreader portion 101 such that the forward coupler 121 is disposed within the first portion 31 of the forward lateral member and fastener 17 passes through the entire diameter of the forward coupler 121 and the entire diameter of the first portion 31 of the forward lateral member (i.e., the forward coupler 121 and the first portion 31 may each include holes corresponding to the fastener 17). The forward coupler 121 may include slots 122 such that the forward coupler 121 can be attached to the second spreader portion 201 such that the forward coupler 121 is inserted into the second portion 32 of the forward lateral member (without interfering with fastener 18). In the attached configuration (see FIG. 1), fastener 18 passes through the entire diameter of the forward coupler 121 and the entire diameter of the second portion 32 of the forward lateral member (i.e., the second portion 32 may include holes corresponding to the fastener 18).

The couplers 121 and 131, in addition to facilitating attachment and alignment as described above, increase strength and the ability to transfer loads (e.g., shear, bending, axial) through the separable multiple-piece frame assembly 100. As described above, the lateral members (which are continuous along the lateral length of conventional seats) play a significant role for transferring load due to the passenger of the seat through the structure of the seat and into the floor and/or substructure of the vehicle. To efficiently transfer load between first portion 31 and second portion 32 (and between first portion 41 and second portion 42), the couplers 121 and 131 are designed with tight tolerances to engage the respective inner surfaces of the appropriate lateral members. In addition, as discussed above, the couplers 121, 131 are fixed to the lateral members with at least one fastener (e.g., fasteners 17, 19). Although the couplers 121, 131 are illustrated with fixed attachment to one fastener each (see fasteners 17, 19) and with clearance slots for fasteners at an opposite end of the coupler (see slots 122, 132 for interfacing with fasteners 18, 20), the couplers 121, 131 may be configured with fixed attachment to fasteners at each end thereof. The separable multiple-piece frame assembly 100 includes provisions (e.g., portions 111-116, 211-216) for a plurality of fasteners (e.g., fasteners 11-16) to attach and to transfer loads between the first spreader portion 101 and the second spreader portion 201. However, in some embodiments, a significant portion of the loads transferred between the first spreader portion 101 and the second spreader portion 201 will ultimately be transferred to the lateral members such that the couplers 121, 131 provide a more direct load path (compared to fasteners 11-16). Accordingly, in certain embodiments, the couplers 121, 131 combine with the provisions for attaching the first spreader portion 101 and the second spreader portion 201 to maximize structural efficiency of the separable multiple-piece frame assembly 100.

Although the aft coupler 131 is shown attached to the first spreader portion 101, the aft coupler 131 may be attached to the second spreader portion 201. In some embodiments, as shown in FIGS. 3 and 5, the aft coupler 131 is a hollow cylindrical member attached to the first spreader portion 101 such that the aft coupler 131 is disposed within the first portion 41 of the aft lateral member and fastener 19 passes through the entire diameter of the aft coupler 131 and the entire diameter of the first portion 41 of the aft lateral member (i.e., the aft coupler 131 and the first portion 41 may each include holes corresponding to the fastener 19). The aft coupler 131 may include slots 132 such that the aft coupler 131 can be attached to the second spreader portion 201 such that the aft coupler 131 is inserted into the second portion 42 of the aft lateral member (without interfering with fastener 20). In the attached configuration (see FIG. 1), fastener 20 passes through the entire diameter of the aft coupler 131 and the entire diameter of the second portion 42 of the aft lateral member (i.e., the second portion 42 may include holes corresponding to the fastener 20).

As shown in FIGS. 3 and 4, the armrest assembly 60 includes a fitting 61 that is sandwiched between upper portion 104 (of the first spreader portion 101) and upper portion 204 (of the second spreader portion 201). In some embodiments, in the attached configuration, fastener 16 passes through upper portion 104, fitting 61, and upper portion 204. The fitting 61 may also include at least one fastener for attaching to at least one of the upper portion 104 and the upper portion 204. The upper portion 104 and/or the upper portion 204 may include a recessed area that approximately corresponds to the shape of fitting 61. Although the drawings illustrate an example where the upper portion 104 and the upper portion 204 each include an approximately equal recessed area (such that the armrest assembly 60 would be approximately centered in the attached configuration), the upper portion 104 and the upper portion 204 may include different recesses (e.g., one may include a recess and one may include little or no recess).

A method of assembling a seat that incorporates the separable multiple-piece frame assembly 100 may include attaching both the first spreader portion 101 and the second spreader portion 201 to the appropriate portions of the forward and aft lateral members. For example, the first spreader portion 101 may be attached to (i) the first portion 31 of the forward lateral member using fastener 17 at forward portion 102 and to (ii) the first portion 41 of the aft lateral member using fastener 19 at aft portion 103. The second spreader portion 201 may be attached to (i) the second portion 32 of the forward lateral member using fastener 18 at forward portion 202 and to (ii) the second portion 42 of the aft lateral member using fastener 20 at aft portion 203. In some embodiments, before attaching the first spreader portion 101 with the forward and aft lateral members, it may be necessary to insert forward coupler 121 and aft coupler 131 into their respective appropriate positions. For example, the assembly may include inserting forward coupler 121 into the first portion 31 of the forward lateral member before inserting fastener 17 through aligned holes in the forward portion 102, the forward coupler 121, and the first portion 31 of the forward lateral member. The assembly may also include inserting aft coupler 131 into the first portion 41 of the aft lateral member before inserting fastener 19 through aligned holes in the aft portion 103, the aft coupler 131, and the first portion 41 of the aft lateral member.

In some embodiments, before attaching the first spreader portion 101 and the second spreader portion 201 to one another, the assembly may include attaching the armrest assembly 60 to one of the first spreader portion 101 and the second spreader portion 201. FIG. 2 shows the armrest assembly 60 attached to the second spreader portion 201, but the armrest assembly 60 may be attached to the first spreader portion 101.

The assembly of the seat may also include aligning the first spreader portion 101 and the second spreader portion 201 such that the forward coupler 121 is aligned with the corresponding hole of the forward portion 202 and the aft coupler 131 is aligned with the corresponding hole of the aft portion 203. As, shown in FIGS. 2, 3, and 5, to avoid interfering with the fasteners of the second spreader portion 201, the forward coupler 121 includes slots 122 that correspond to the fastener 18 and the aft coupler 131 includes slots 132 that correspond to the fastener 20. Thus, the assembly may include aligning slots 122 of the forward coupler 121 with fastener 18 of the second spreader portion 201 and aligning slots 132 of the aft coupler 131 with fastener 20 of the second spreader portion 201. After aligning, the assembly may include attaching the first spreader portion 101 and the second spreader portion 201 such that the inner face 101.1 of the first spreader portion 101 and the inner face 201.1 of the second spreader portion 201 are in contact with one another such that a plurality of fasteners (e.g., fasteners 11-16) attach the respective fastener portions (which described above).

The components of the separable multiple-piece frame assembly 100 may be formed of materials including, but not limited to, aluminum, steel, titanium, carbon composite, graphite composite, polyester, nylon, plastic, thermoplastic, other fabric materials, stainless steel, other plastic or polymer materials, other metallic materials, other composite materials, or other similar materials. Moreover, the components of the separable multiple-piece frame assembly 100 may be attached to one another via suitable fasteners, which include, but are not limited to, screws, bolts, rivets or other mechanical or chemical fasteners.

In the following, further examples are described to facilitate understanding of aspects of the invention:

Example A. A separable multiple-piece frame assembly for a passenger seat of a vehicle, the separable multiple-piece frame assembly comprising:
 a first spreader portion with an inner face;
 a second spreader portion with an inner face;
 a plurality of attachments for releasably attaching the first spreader portion and the second spreader portion; and
 an attached configuration, wherein the inner face of the first spreader portion and the inner face of the second spreader portion are in contact with one another.

Example B. The separable multiple-piece frame assembly of Example A or any of the preceding or subsequent examples, wherein the plurality of attachments comprise at least one of fasteners and clamps.

Example C. The separable multiple-piece frame assembly of Example A or any of the preceding or subsequent examples, wherein:
 a first portion of a forward lateral member extends from the first spreader portion in a direction opposite from the inner face of the first spreader portion; and
 a second portion of the forward lateral member extends from the second spreader portion in a direction opposite from the inner face of the second spreader portion.

Example D. The separable multiple-piece frame assembly of Example C or any of the preceding or subsequent examples, wherein:
 a first portion of an aft lateral member extends from the first spreader portion in a direction opposite from the inner face of the first spreader portion; and a second portion of the aft lateral member extends from the second spreader portion in a direction opposite from the inner face of the second spreader portion.

Example E. The separable multiple-piece frame assembly of Example D or any of the preceding or subsequent examples, further comprising:
a forward coupler, wherein, in the attached configuration, the forward coupler extends between (i) an interface of the first portion of the forward lateral member and the first spreader portion and (ii) an interface of the second portion of the forward lateral member and the second spreader portion; and
an aft coupler, wherein, in the attached configuration, the aft coupler extends between (i) an interface of the first portion of the aft lateral member and the first spreader portion and (ii) an interface of the second portion of the aft lateral member and the second spreader portion.

Example F. The separable multiple-piece frame assembly of Example E or any of the preceding or subsequent examples, wherein the forward coupler comprises:
a hollow cylindrical member that is disposed within the forward lateral member; and
a fastener for securing the forward coupler relative to the first spreader portion passes through a full diameter of the forward coupler and a full diameter of the forward lateral member.

Example G. The separable multiple-piece frame assembly of Example A or any of the preceding or subsequent examples, wherein:
the first spreader portion comprises a seat pan portion and a seat back portion; and
the second spreader portion comprises a seat pan portion and a seat back portion.

Example H. The separable multiple-piece frame assembly of Example G or any of the preceding or subsequent examples, wherein the plurality of attachments comprise:
at least two seat pan fasteners attaching the seat pan portion of the first spreader portion to the seat pan portion of the second spreader portion; and
at least two seat back fasteners attaching the seat back portion of the first spreader portion to the seat back portion of the second spreader portion.

Example I. The separable multiple-piece frame assembly of Example H or any of the preceding or subsequent examples, wherein the at least two seat pan fasteners comprise at least one of (i) a fastener located under an interface with a forward lateral member and (ii) a fastener located under an interface with an aft lateral member.

Example J. The separable multiple-piece frame assembly of Example A or any of the preceding or subsequent examples, wherein an armrest assembly comprises a fitting that is sandwiched between the first spreader portion and the second spreader portion in the attached configuration.

Example K. A passenger seat comprising:
a separable multiple-piece frame assembly comprising (i) a first spreader portion with an inner face and (ii) a second spreader portion with an inner face;
a forward lateral member comprising:
a first portion attached to the first spreader portion and extending away from the first spreader portion in a direction that is approximately perpendicular to the inner face of the first spreader portion; and
a second portion attached to the second spreader portion and extending away from the second spreader portion in a direction that is approximately perpendicular to the inner face of the second spreader portion;
an aft lateral member comprising:
a first portion attached to the first spreader portion and extending away from the first spreader portion in a direction that is approximately perpendicular to the inner face of the first spreader portion; and
a second portion attached to the second spreader portion and extending away from the second spreader portion in a direction that is approximately perpendicular to the inner face of the second spreader portion, wherein:
the separable multiple-piece frame assembly comprises provisions for removably attaching the first spreader portion and the second spreader portion; and
the separable multiple-piece frame assembly comprises an attached configuration, wherein the inner face of the first spreader portion and the inner face of the second spreader portion are in contact with one another.

Example L. The passenger seat of Example K or any of the preceding or subsequent examples, wherein the separable multiple-piece frame assembly comprises a plurality of attachments for releasably attaching the first spreader portion and the second spreader portion.

Example M. The passenger seat of Example K or any of the preceding or subsequent examples, further comprising:
a forward coupler, wherein, in the attached configuration, the forward coupler extends between (i) an interface of the first portion of the forward lateral member and the first spreader portion and (ii) an interface of the second portion of the forward lateral member and the second spreader portion; and
an aft coupler, wherein, in the attached configuration, the aft coupler extends between (i) an interface of the first portion of the aft lateral member and the first spreader portion and (ii) an interface of the second portion of the aft lateral member and the second spreader portion.

Example N. The passenger seat of Example M or any of the preceding or subsequent examples, wherein the forward coupler comprises:
a hollow cylindrical member that is disposed within the forward lateral member; and
a fastener for securing the forward coupler relative to the first spreader portion passes through a full diameter of the forward coupler and a full diameter of the forward lateral member.

Example O. The passenger seat of Example L or any of the preceding or subsequent examples, wherein:
the first spreader portion comprises a seat pan portion and a seat back portion; and
the second spreader portion comprises a seat pan portion and a seat back portion.

Example P. The passenger seat of Example 0 or any of the preceding or subsequent examples, wherein the plurality of attachments comprise:
at least two seat pan fasteners attaching the seat pan portion of the first spreader portion to the seat pan portion of the second spreader portion; and
at least two seat back fasteners attaching the seat back portion of the first spreader portion to the seat back portion of the second spreader portion.

Example Q. The passenger seat of Example P or any of the preceding or subsequent examples, wherein the at least two seat pan fasteners comprise at least one of (i) a fastener located under an interface with the forward lateral member and (ii) a fastener located under an interface with the aft lateral member.

Example R. The passenger seat of Example K or any of the preceding or subsequent examples, wherein an armrest assembly comprises a fitting that is sandwiched between the first spreader portion and the second spreader portion in the attached configuration.

Example S. A method of assembling a passenger seat comprising:
providing a separable multiple-piece frame assembly comprising a first spreader portion with an inner face and a second spreader portion with an inner face;
attaching a first portion of a forward lateral member to the first spreader portion;
attaching a second portion of the forward lateral member to the second spreader portion;
attaching a first portion of an aft lateral member to the first spreader portion;
attaching a second portion of the aft lateral member to the second spreader portion; and
attaching the first spreader portion and the second spreader portion such that the inner face of the first spreader portion and the inner face of the second spreader portion are in contact with one another.

Example T. The method of Example S or any of the preceding or subsequent examples, further comprising:
attaching a forward coupler to at least one of the first spreader portion and the second spreader portion such that, in an attached configuration, the forward coupler extends between (i) an interface of the first portion of the forward lateral member and the first spreader portion and (ii) an interface of the second portion of the forward lateral member and the second spreader portion; and
attaching an aft coupler to at least one of the first spreader portion and the second spreader portion such that, in the attached configuration, the aft coupler extends between (i) an interface of the first portion of the aft lateral member and the first spreader portion and (ii) an interface of the second portion of the aft lateral member and the second spreader portion.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A separable multiple-piece frame assembly for a passenger seat of a vehicle, the separable multiple-piece frame assembly comprising:
a first spreader portion with a first face;
a second spreader portion with a second face;
a plurality of attachments for releasably attaching the first spreader portion and the second spreader portion;
an attached configuration, wherein the first face of the first spreader portion and the second face of the second spreader portion are in contact with one another; and
an armrest assembly comprising a single armrest having a fitting that is sandwiched between the first spreader portion and the second spreader portion in the attached configuration.

2. The separable multiple-piece frame assembly of claim 1, wherein the plurality of attachments comprise at least one of fasteners and clamps.

3. The separable multiple-piece frame assembly of claim 1, wherein:
a first portion of a forward lateral member extends from the first spreader portion in a direction opposite from the first face of the first spreader portion; and
a second portion of the forward lateral member extends from the second spreader portion in a direction opposite from the second face of the second spreader portion.

4. The separable multiple-piece frame assembly of claim 3, wherein:
a first portion of an aft lateral member extends from the first spreader portion in a direction opposite from the first face of the first spreader portion; and
a second portion of the aft lateral member extends from the second spreader portion in a direction opposite from the second face of the second spreader portion.

5. The separable multiple-piece frame assembly of claim 4, further comprising:
a forward coupler, wherein, in the attached configuration, the forward coupler extends between (i) an interface of the first portion of the forward lateral member and the first spreader portion and (ii) an interface of the second portion of the forward lateral member and the second spreader portion; and
an aft coupler, wherein, in the attached configuration, the aft coupler extends between (i) an interface of the first portion of the aft lateral member and the first spreader portion and (ii) an interface of the second portion of the aft lateral member and the second spreader portion.

6. The separable multiple-piece frame assembly of claim 5, wherein the forward coupler comprises:
a hollow cylindrical member that is disposed within the forward lateral member; and
a fastener for securing the forward coupler relative to the first spreader portion passes through a full diameter of the forward coupler and a full diameter of the forward lateral member.

7. The separable multiple-piece frame assembly of claim 1, wherein:
the first spreader portion comprises a seat pan portion and a seat back portion; and
the second spreader portion comprises a seat pan portion and a seat back portion.

8. The separable multiple-piece frame assembly of claim 7, wherein the plurality of attachments comprise:
at least two seat pan fasteners attaching the seat pan portion of the first spreader portion to the seat pan portion of the second spreader portion; and
at least two seat back fasteners attaching the seat back portion of the first spreader portion to the seat back portion of the second spreader portion.

9. The separable multiple-piece frame assembly of claim 8, wherein the at least two seat pan fasteners comprise at least one of (i) a fastener located under an interface with a forward lateral member and (ii) a fastener located under an interface with an aft lateral member.

10. A passenger seat comprising:
a separable multiple-piece frame assembly comprising (i) a first spreader portion with a first face and (ii) a second spreader portion with a second face;
a forward lateral member comprising:
a first portion attached to the first spreader portion and extending away from the first spreader portion in a direction that is approximately perpendicular to the first face of the first spreader portion; and a second portion attached to the second spreader portion and extending away from the second spreader portion in a direction that is approximately perpendicular to the second face of the second spreader portion;

an aft lateral member comprising:
a first portion attached to the first spreader portion and extending away from the first spreader portion in a direction that is approximately perpendicular to the first face of the first spreader portion; and a second portion attached to the second spreader portion and extending away from the second spreader portion in a direction that is approximately perpendicular to the second face of the second spreader portion, wherein:

the separable multiple-piece frame assembly comprises provisions for removably attaching the first spreader portion and the second spreader portion;

the separable multiple-piece frame assembly comprises an attached configuration, wherein the first face of the first spreader portion and the second face of the second spreader portion are in contact with one another; and an armrest assembly comprising a single armrest having a fitting that is sandwiched between the first spreader portion and the second spreader portion in the attached configuration.

11. The passenger seat of claim 10, wherein the separable multiple-piece frame assembly comprises a plurality of attachments for releasably attaching the first spreader portion and the second spreader portion.

12. The passenger seat of claim 10, further comprising:
a forward coupler, wherein, in the attached configuration, the forward coupler extends between (i) an interface of the first portion of the forward lateral member and the first spreader portion and (ii) an interface of the second portion of the forward lateral member and the second spreader portion; and an aft coupler, wherein, in the attached configuration, the aft coupler extends between (i) an interface of the first portion of the aft lateral member and the first spreader portion and (ii) an interface of the second portion of the aft lateral member and the second spreader portion.

13. The passenger seat of claim 12, wherein the forward coupler comprises:
a hollow cylindrical member that is disposed within the forward lateral member; and a fastener for securing the forward coupler relative to the first spreader portion passes through a full diameter of the forward coupler and a full diameter of the forward lateral member.

14. The passenger seat of claim 11, wherein:

the first spreader portion comprises a seat pan portion and a seat back portion; and the second spreader portion comprises a seat pan portion and a seat back portion.

15. The passenger seat of claim 14, wherein the plurality of attachments comprise:
at least two seat pan fasteners attaching the seat pan portion of the first spreader portion to the seat pan portion of the second spreader portion; and at least two seat back fasteners attaching the seat back portion of the first spreader portion to the seat back portion of the second spreader portion.

16. The passenger seat of claim 15, wherein the at least two seat pan fasteners comprise at least one of (i) a fastener located under an interface with the forward lateral member and (ii) a fastener located under an interface with the aft lateral member.

17. A method of assembling a passenger seat comprising:
providing a separable multiple-piece frame assembly comprising a first spreader portion with a first face and a second spreader portion with a second face;

attaching a first portion of a forward lateral member to the first spreader portion;

attaching a second portion of the forward lateral member to the second spreader portion;

attaching a first portion of an aft lateral member to the first spreader portion;

attaching a second portion of the aft lateral member to the second spreader portion;

attaching a single armrest having a fitting by sandwiching the fitting between the first spreader portion and the second spreader portion; and attaching the first spreader portion and the second spreader portion such that the first face of the first spreader portion and the second face of the second spreader portion are in contact with one another and sandwich the fitting of the single armrest.

18. The method of claim 17, further comprising:
attaching a forward coupler to at least one of the first spreader portion and the second spreader portion such that, in an attached configuration, the forward coupler extends between (i) an interface of the first portion of the forward lateral member and the first spreader portion and (ii) an interface of the second portion of the forward lateral member and the second spreader portion; and attaching an aft coupler to at least one of the first spreader portion and the second spreader portion such that, in the attached configuration, the aft coupler extends between (i) an interface of the first portion of the aft lateral member and the first spreader portion and (ii) an interface of the second portion of the aft lateral member and the second spreader portion.

* * * * *